United States Patent
Kragel et al.

(10) Patent No.: US 12,001,359 B2
(45) Date of Patent: Jun. 4, 2024

(54) IDENTIFICATION AND CLASSIFICATION OF WRITE STREAM PRIORITY

(71) Applicant: Western Digital Technologies, Inc., San Jose, CA (US)

(72) Inventors: Oleg Kragel, San Jose, CA (US); Xiangyu Tang, San Jose, CA (US); Vijay Sivasankaran, Dublin, CA (US); Mikhail Palityka, Oakville (CA)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/948,059

(22) Filed: Sep. 19, 2022

(65) Prior Publication Data

US 2023/0017171 A1 Jan. 19, 2023

Related U.S. Application Data

(63) Continuation of application No. 17/187,046, filed on Feb. 26, 2021, now Pat. No. 11,449,443.

(Continued)

(51) Int. Cl.
G06F 13/18 (2006.01)
G06F 13/16 (2006.01)
G06F 13/42 (2006.01)

(52) U.S. Cl.
CPC .......... *G06F 13/18* (2013.01); *G06F 13/1668* (2013.01); *G06F 13/4282* (2013.01)

(58) Field of Classification Search
None
See application file for complete search history.

(56) References Cited

U.S. PATENT DOCUMENTS 7,944,935 B2 * 5/2011 Bucknell ............... H04W 28/14
370/417
8,738,820 B2 * 5/2014 Kesselman ............. H04L 47/70
710/33

(Continued)

OTHER PUBLICATIONS

Liu, WG, et al. "ROCO: Using a Solid State Drive Cache to Improve the Performance of a Host-Aware Shingled Magnetic Recording Drive", Journal of Computer Science and Technology, 2019, vol. 34, No. 1, pp. 61-76.

(Continued)

*Primary Examiner* — Michael Sun
(74) *Attorney, Agent, or Firm* — Rutan & Tucker LLP; Hani Z. Sayed; Ravi Mohan

(57) ABSTRACT

Increases in efficiency of storage device operation may be realized if the limited number of available high-priority communication channels are better optimized and assigned among hosts that may best utilize them. This assignment can occur in response to an evaluation of the overall zone usage or by received metadata and/or indicia from the host. The storage device may periodically, or in response to a command, reevaluate the assigned priority status of each communication channel and associated host/zone pair. For example, the storage device may demote or remove a communication channel from high-priority to low-priority. This process can be continued during a preconfigured time window which can be adjusted before, during, or after priority evaluation. The continuous operation of this process can allow for adjustments being made to priority levels within the storage device that may further increase total operational efficiency.

20 Claims, 7 Drawing Sheets

Related U.S. Application Data

(60) Provisional application No. 63/092,923, filed on Oct. 16, 2020.

(56)   References Cited

U.S. PATENT DOCUMENTS

| | | | | |
|---|---|---|---|---|
| 9,389,952 | B2* | 7/2016 | Yu | G11C 29/52 |
| 9,634,944 | B2* | 4/2017 | Chinnaiah Sankaran | H04L 47/2441 |
| 10,732,897 | B2* | 8/2020 | Benisty | G06F 3/0679 |
| 11,042,306 | B2* | 6/2021 | Muchherla | G06F 3/064 |
| 2005/0114557 | A1* | 5/2005 | Arai | G06F 3/0607 710/5 |
| 2006/0179163 | A1* | 8/2006 | Muramatsu | G06F 3/0611 710/1 |
| 2017/0123928 | A1 | 5/2017 | Smith et al. | |
| 2019/0179570 | A1 | 6/2019 | Bahirat et al. | |

OTHER PUBLICATIONS

Wu, F. et al., "Performance Evaluation of Host Aware Shingled Magnetic Recording (HA-SMR) Drives", IEEE Transactions on Computers, 2017, vol. 66, No. 11, pp. 1932-1945.

Xie, X. et al., "SMRC: An endurable SSD cache for host-aware shingled magnetic recording drives", IEEE Access 6, 2018, pp. 20916-20928.

Xie, X. et al., "ZoneTier: A Zone-based Storage Tiering and Caching Co-design to Integrate SSDs with SMR Drives", ACM Transactions on Storage (TOS), Jul. 10, 2019, vol. 15, No. 3, p. 19.

* cited by examiner

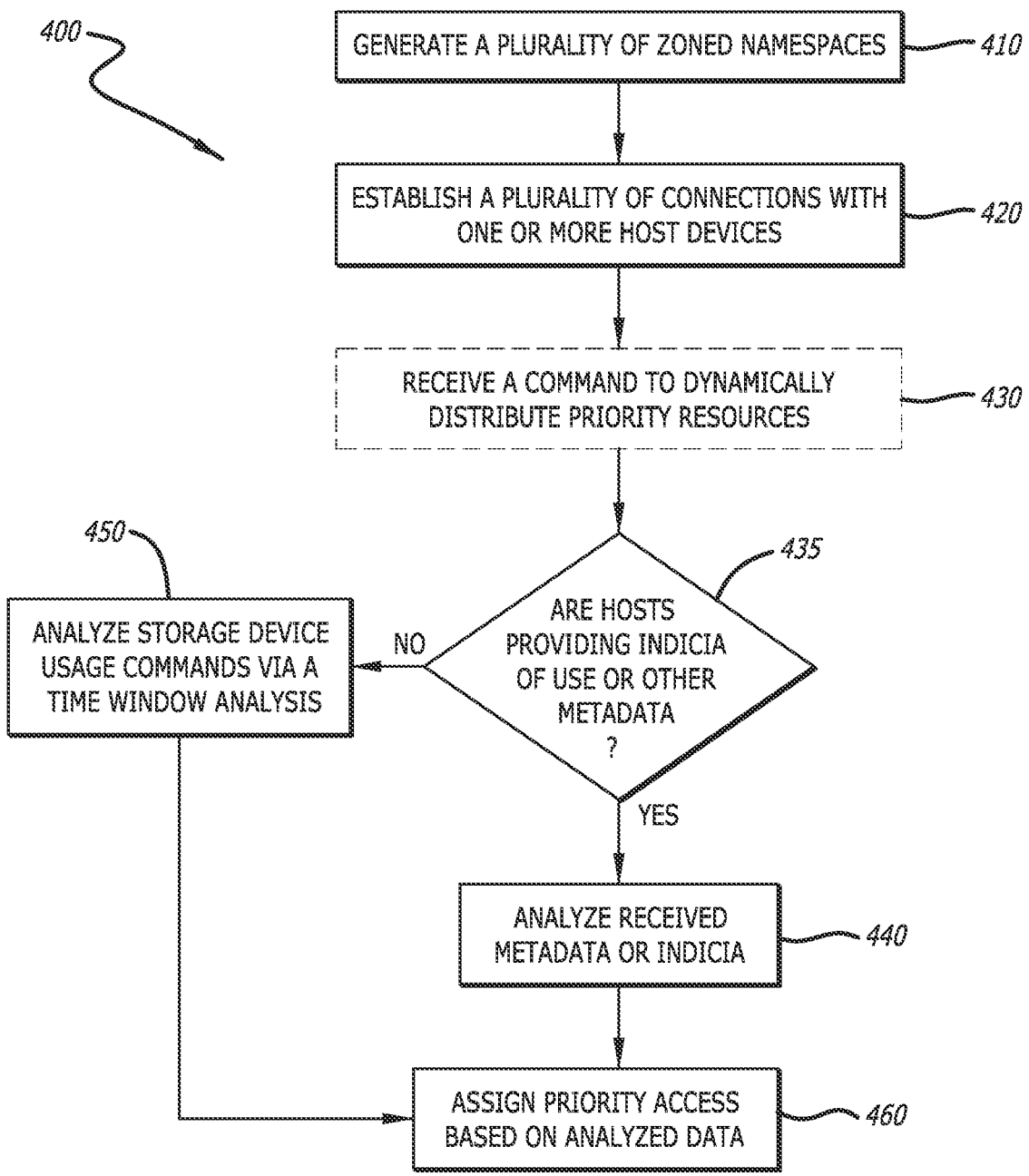

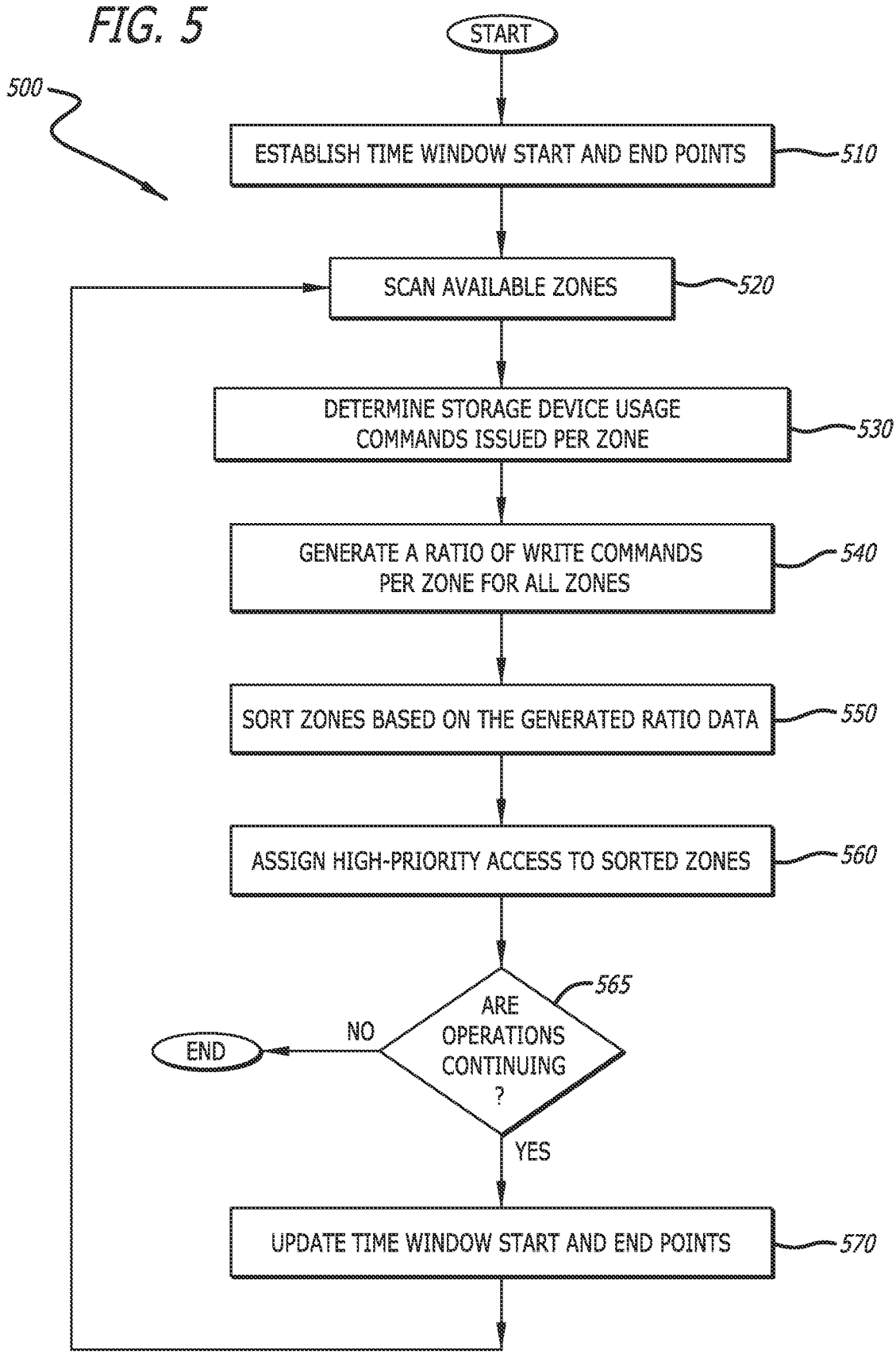

IDENTIFICATION AND CLASSIFICATION OF WRITE STREAM PRIORITY

PRIORITY

This application claims the benefit of and priority to U.S. patent application Ser. No. 17/187,046 filed on Feb. 26, 2021 and U.S. Provisional Application No. 63/092,923, filed Oct. 16, 2020, which is incorporated in its entirety herein.

FIELD

The present disclosure relates to storage systems. More particularly, the present disclosure relates to identifying and dynamically adjusting the resource priorities of write streams associated with hosts and zones.

BACKGROUND

Storage devices are ubiquitous within computing systems. Recently, solid-state memory devices capable of nonvolatile storage have become the predominant choice within various consumer electronics products. These storage devices can communicate and utilize various protocols including non-volatile memory express (NVMe), and peripheral component interconnect express (PCIe) to reduce processing overhead and increase efficiency.

As processing capabilities have grown, the use of virtual machines has also increased. Virtual machines are an emulation of a computer system that is itself processed and executed as part of another computer system to provide functionality similar to that of a traditional physical computing device. It is becoming more common for various companies to utilize their available computing resources to provide virtual machines to customers as a service. Once established, a virtual machine may act as a virtual host when communicating with one or more storage devices.

It has also become increasingly more common for a storage device to be in communication with a multitude of hosts, including virtual hosts. Each of these virtual hosts may be sending various commands to read and/or write data to the storage device (i.e., write and read streams). Often, the storage device may be partitioned into zones that are assigned to a single host. When communicating with the storage device, many hosts may be provided with low-priority or high-priority access.

High-priority communication access may be allocated with more resources and can provide a faster level of access compared to low-priority communication access. A storage device can be configured such that a fixed number of high-priority communication paths are assignable to one or more hosts. However, many storage devices do not have sufficient methods to determine which communication paths between the storage device and the one or more connected hosts should be given priority. As a result, inefficient usage of the storage device resources can occur leaving certain hosts suffering from lowered performance.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 4 is a flowchart depicting a process for identifying and assigning write stream priorities in accordance with embodiments of the disclosure;

FIG. 5 is a flowchart depicting a process for identifying and assigning write stream priorities within a time window in accordance with an embodiment of the disclosure.

Figure 1:
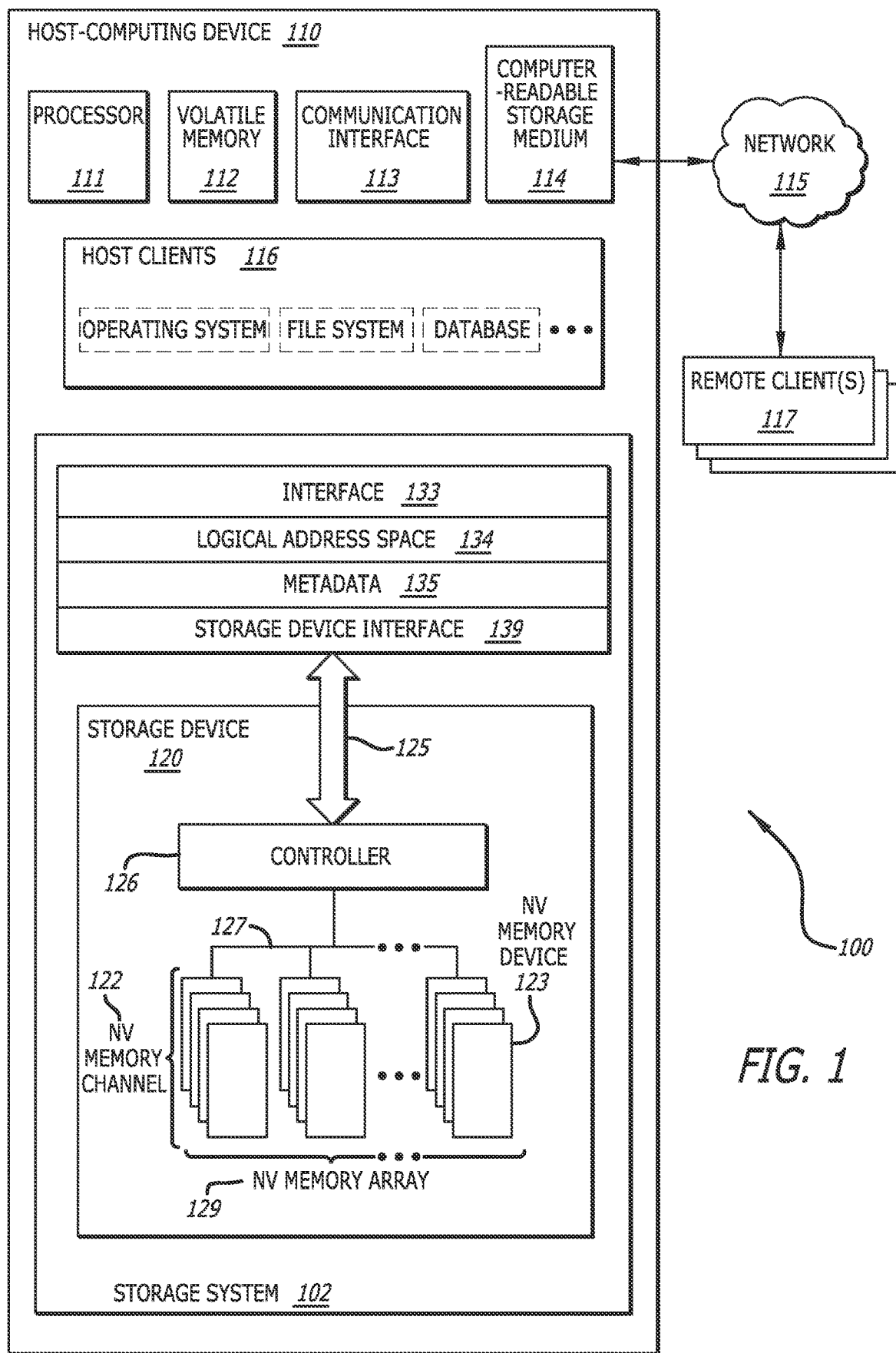
FIG. 1 is schematic block diagram of a host-computing device with a storage device suitable for write stream priority assignment in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that describe identifying and classifying write stream priorities from hosts associated with a zone of storage within a storage device. As will be described in more detail below, increases in efficiency of storage device operation may be realized if the limited number of available high-priority communication channels are better optimized and assigned among hosts that may best utilize them. This assignment can occur in response to an evaluation of the overall zone usage or by received metadata and/or indicia from the host.

Often, the storage device will be in communication with a number of virtual hosts. These virtual hosts can be instantiated at various points during operation, establish connections, and change operating patterns. For example, a storage device may have the available high-priority communication channels assigned to a fixed number of virtual hosts. One virtual host and associated zone may be given the highest priority ranking due to a large number of storage device usage commands (e.g., write stream commands) that are received. Subsequently, another group of virtual hosts are generated and establish connections to the storage device. The new set of virtual hosts may have more demanding write stream needs compared to the original virtual hosts. Additionally, the original virtual host that demanded the most high-priority resources can now be relatively dormant as the previous operations are completed. In traditional systems, the storage device would not be able to derive this data and would retain the priority of the communication channels in a status quo configuration.

However, embodiments of the present disclosure can allow for the storage device to either periodically, or in response to a command, reevaluate the assigned priority status of each communication channel and associated host/zone pair. This may allow for the storage device to demote or remove a communication channel from high-priority to low-priority. This process can be continued during a pre-configured time window which can be adjusted before, during, or after priority evaluation. The continuous operation of this process can allow for adjustments being made to priority levels within the storage device that may further increase total operational efficiency.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages.

The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device 110 with a storage system 102 suitable for write stream priority assignment in accordance with an embodiment of the disclosure is shown. The write stream priority assignment system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote host clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
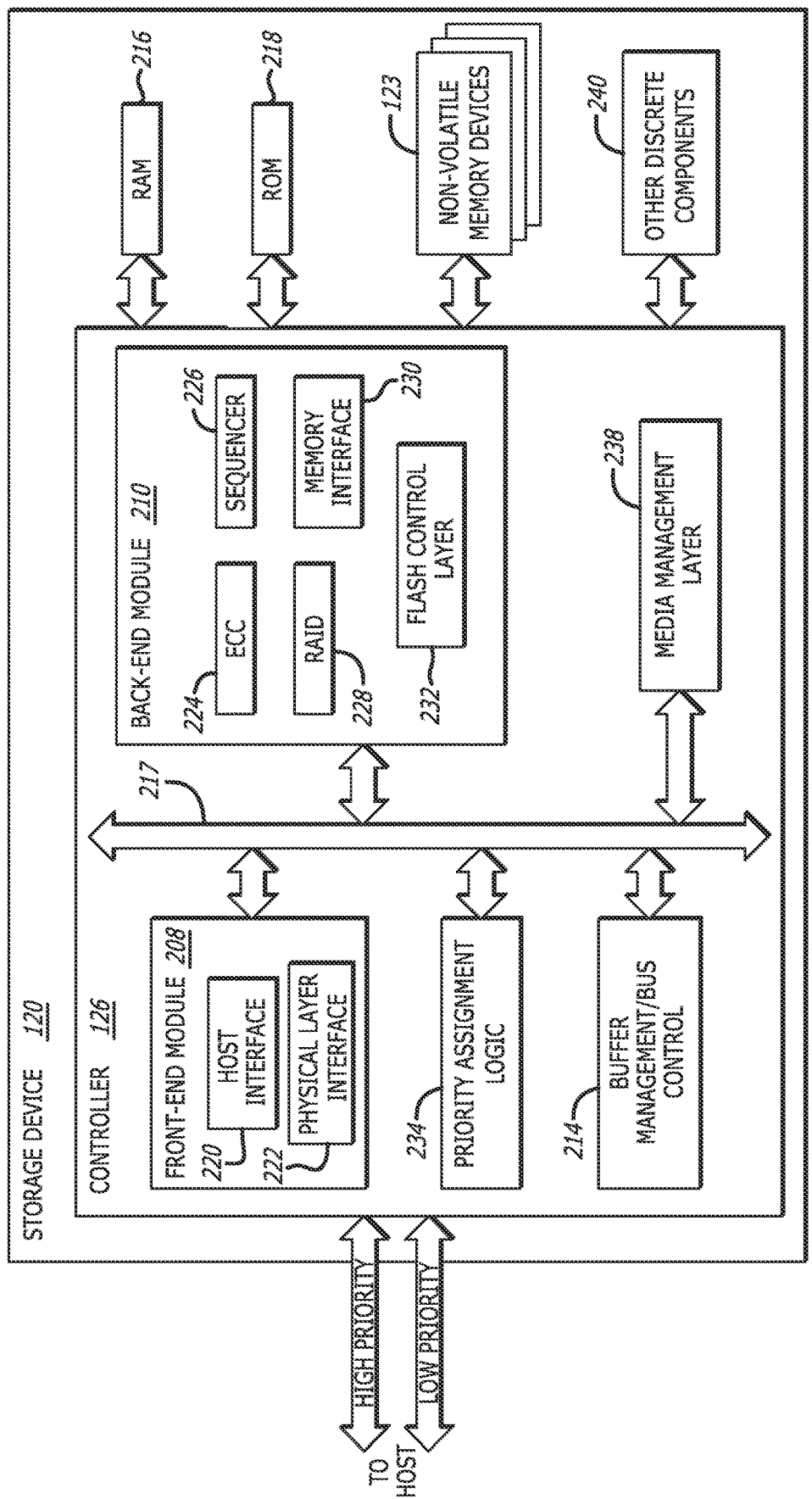
FIG. 2 is a schematic block diagram of a storage device suitable for write stream priority assignment in accordance with an embodiment of the disclosure.

Referring to FIG. 2, a schematic block diagram of a storage device 120 suitable for write stream priority assignment in accordance with an embodiment of the disclosure. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus controller 214 are optional components that may not be necessary in the controller 126.

Finally, the controller 126 may also comprise a priority assignment logic 234. In many embodiments, the priority assignment logic 234 can be configured to analyze data, determine priority rankings, and/or change assignments of communication channel priorities between hosts and the storage device 120. As discussed in more detail below, the priority assignment logic 234 may track, analyze and/or log storage device usage commands being received from each connected host. Based on this stored data, a ranking may be generated which can be configured based on a variety of metrics and/or data measurements. Furthermore, as described within the discussion of FIGS. 6A-6B, the priority assignment logic 234 may reassign priorities based on newly evaluated host connections.

Figure 3:
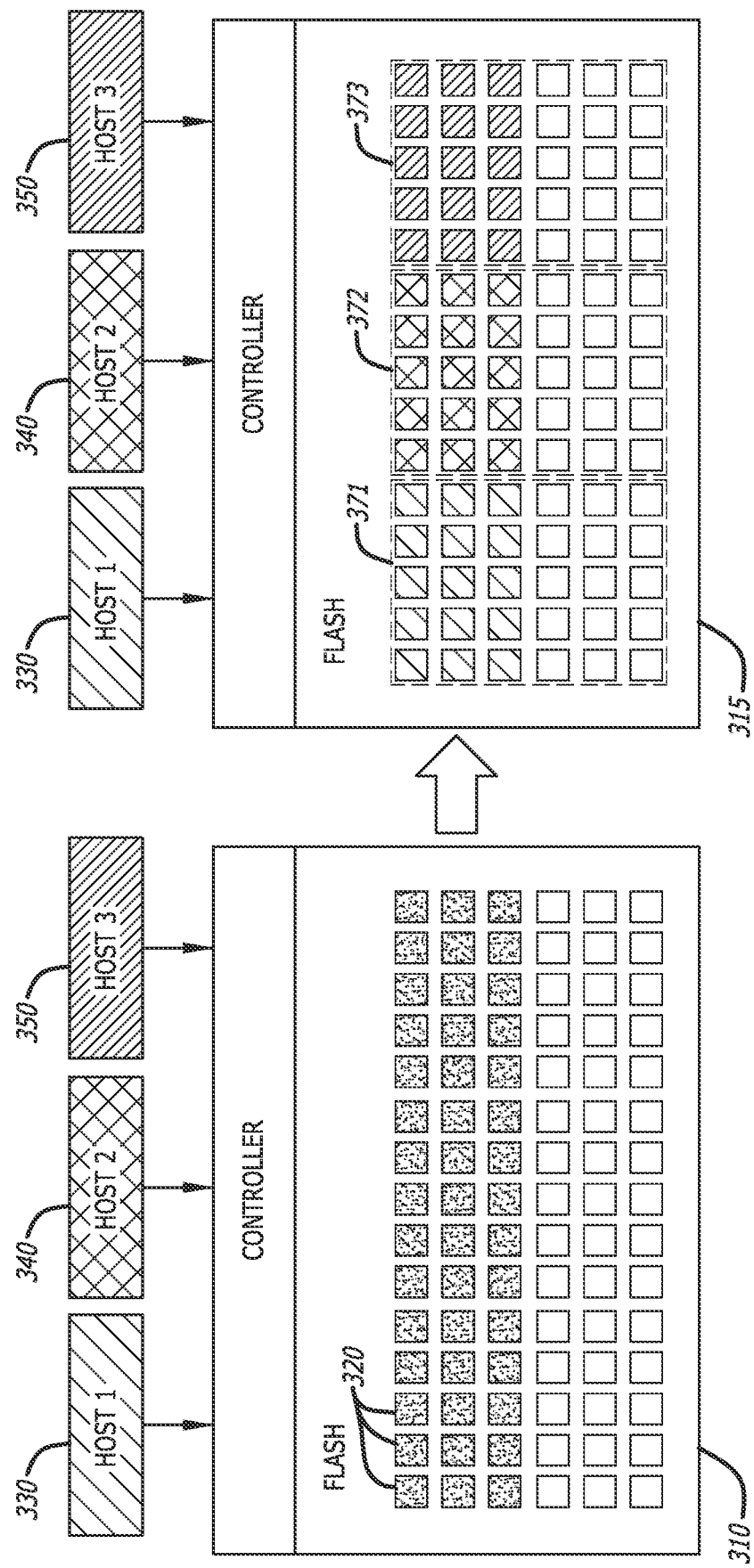
FIG. 3 is a conceptual illustration of a storage device being formatted into zoned namespaces in accordance with an embodiment of the disclosure.

Referring to FIG. 3, a conceptual illustration of a storage device being formatted into zoned namespaces in accordance with an embodiment of the disclosure is shown. In a variety of embodiments, zones are utilized within the storage device such that the memory devices allocated to each zone are only utilized by the host assigned to that zone. As those skilled in the art will understand, a storage device can be divided up into any number of zones and can only be limited by the number of available memory devices and/or the available processing resources for facilitating zones.

In further embodiments, storage devices may utilize the NVMe specification for communication with various hosts. In those embodiments, a zoned namespace (ZNS) command set can be utilized which is defined by the NVMe protocols. Specifically, ZNS may be allow for each zone to be sequentially written and reset explicitly. The boundaries of the zones within ZNS systems can be exposed to the host owner which may then work in tandem with the storage device to collaborate on data placement. In this way, the storage device can avoid having to manage random writes and can therefore implement more efficient operations.

In the conceptual embodiment depicted in FIG. 3, a storage device 310 is shown prior to formatting (left side) and after formatting to comprise a plurality (3) of zones (right side). Prior to formatting, the storage device 310 contains a plurality of memory devices 320 that can be accessed by any of the connected hosts 330, 340, 350. Therefore, each memory device 320 may comprise data that has been written by a first host 330 (shown as "host 1"), second host 340 (shown as "host 2"), or third host 350 (shown as "host 3").

Once formatted into a zone-based storage device 315, the memory device 320 within the memory array are grouped into three separate zones 371, 372, 373. In the embodiment depicted, the first zone 371 is associated with the first host 330, the second zone 372 is associated with the second host 340, and the third zone 373 is associated with the third host 350. As configured, the first host will have exclusive access to store data within the memory devices of the first zone 371. Likewise, the second zone 372 will only comprise data received from the second host 340, and the third zone 350 will comprise data received solely from the third host 350.

As those skilled in the art will recognize, the embodiment depicted in FIG. 3 is presented to conceptually illustrate the concept of zones. As such, embodiments can exist that utilize many more hosts, many more memory devices, and zones that can vary in size and shape as needed. In many embodiments, the zones may be dynamically adjusted and/or resized in response to changing usage patterns. The zone-based storage device 315 can be configured with a plurality of communication channels to connect to the hosts 330, 340, 350. These communication channels may have different levels of resources and processing priority. A process to better determine which host and zone pairing should be assign what priority is discussed in more detail below.

Referring to FIG. 4, a flowchart depicting a process 400 for identifying and assigning write stream priorities in accordance with embodiments of the disclosure is shown. In various embodiments, a storage device may first need to be formatted such that a plurality of zoned namespaces are formed (block 410) utilizing the NVMe specification. It is contemplated however, that other zone-based solutions and protocols may be utilized in a similar manner as required by the application. In response to having a plurality of zones for use, the process 400 can connect each zone to corresponding host devices through a plurality of connections (block 420).

As discussed in more detail above, the plurality of communications may not all be equal and can often contain various types of connections. The difference between types may include increased resources such as, but not limited to, buffers and increased priority scheduling. These increased resources are often limited which lead to these "high-priority" communication channels being limited within a storage device, while the "low-priority" communication channels may not have a similar numerical constraint.

In certain embodiments, the process 400 may be triggered to distribute these high-priority communication channels in response to receiving a command to begin dynamically allocating them (block 430). In additional embodiments, the distribution steps may begin after a predetermined amount of time, or in direct response to a preconfigured action such as, but not limited to, a power-on event, a hard-reset event, and/or the addition of a new host connection. It is contemplated that the received command may be generated internally of the storage device but may also be received externally from a host or other network device.

The process 400 can begin to examine the plurality of connections. Initially, a determination of whether any indications/indicia or other metadata signals are being transmitted by one or more hosts can occur (block 435). Indication data may comprise zone data velocity toward the controller in some embodiments. Utilizing this indication data may enable the controller to enable alternative data-paths for individual zones utilizing more or less caching in the controller's RAM and/or optionally involving one or more zone's data buffers staging in non-volatile memory. Metadata may be transmitted from the host to the storage device during normal operations or with associated zone-based data write streams. As those skilled in the art will recognize, metadata can be formatted to any structure suitable for proper information conveyance. Conceptual examples of metadata structure may include fields that indicate mission critical data, or explicit requests for high or low priority with storing.

In addition to metadata, the storage device may be capable for processing inferences or indicia transmitted by the host or derived from the hosts actions. For example, a pattern of use may be determined based on a routine or timed activity, such as a nightly data backup or increased accessing due to peak host usage corresponding to external activity. It is contemplated that the priority assignment logic 234 (FIG. 2) may have additional data inputs to receive indication data or other input data that can facilitate determination of an indication from one or more hosts.

Whether the host is transmitting metadata or indications of use that may be inferred, the storage device can analyze those received signals (block 440). However, when no metadata or indicia are transmitted by the hosts and/or are not received by the storage device, the process 400 can then analyze the storage device usage commands through a specific time window that were sent by each host (block 450). The storage device can generate ratio data associated with the portion of host data write stream commands sent within the configured time window. So, if a small group of hosts are responsible for a large portion of the received data write stream commands, then these hosts may be assigned high-priority communication channels. In a number of embodiments, these group of hosts may be ranked via ranking data generated by the priority assignment logic. Once ranked and/or otherwise evaluated, the process 400 can assign high- and low-priority access based on the analyzed data (block 460).

Although the process 400 depicted in FIG. 4 shows a binary choice between analyzing and assigning priority via metadata/indicia or a time window analysis, it is contemplated that storage devices may utilize both types of data as needed. In various embodiments, when presented with multiple types of data for analysis, the process 400 may prefer to utilize the metadata/indicia over time window analysis data. Additionally, as hosts may vary, each zone may be evaluated utilizing different types of data, in some embodiments the resulting ranking data being configured to weight certain types of data over others.

Referring to FIG. 5, a flowchart depicting a process 500 for identifying and assigning write stream priorities within a time window in accordance with an embodiment of the disclosure is shown. As described briefly above with respect to FIG. 4, a time window-based analysis of host data stream write patterns can be performed in the absence of available metadata or other indicia of host use. In many embodiments, a rolling time window process may be utilized such that the assignment of priority communication channels occurs periodically to help maximize storage device operational efficiency.

The process 500 can begin by establishing a time window through selecting a starting point and an ending point in time (block 510). Once a time window has been established, the process 500 can scan for available zones within the storage device (block 520). In certain embodiments, particular zones may be deemed to be ineligible for analysis within the time window. This may be, for example, because a particular zone has been inactive for a particular period of time or has been assigned a permanent priority classification.

For each valid zone configured for analysis, the amount and type of storage device usage commands issued per zone can be determined (block 530). As described above, the tracked commands may be stored within a log or other memory device as needed for subsequent processing such as within process 500. Commands may be tracked live as processed or may be retroactively stored from past commands. This may allow for embodiments wherein the time window has a start time set for the present (initialization) time and is scheduled to move forward a predetermined amount of time to some end point in the future.

Once the storage device usage commands have been determined, the process 500 can generate a ratio, via ratio data, of the write stream commands per zone for all valid zones within the storage device (block 540). The ratio data may be generated by evaluating one stored value against one or more other stored values. For example, the process 500 may generate ratio data for each host by comparing the number of write stream requests issued during the established time window against the total number of write stream requests issued by all hosts within the time window. In this way, each host may have a total ratio of generated write requests.

With the generated ratio data, the process 500 can sort the currently evaluated zones for determination of priority status (block 550). In many embodiments, the sorting done is based on a ranking of all analyzed hosts and associated zones. For example, ratio data may indicate the relative amount of data write requests within a given time window. The process 500 may rank the hosts and associated zones in sequential order based on their ratio data. In this way, the hosts that generate the highest number of data write stream requests will be ranked at the top and be more likely to receive a high-priority assignment.

With the sorted zone data, the process 500 can assign various priority access and/or classifications to the zones and associated hosts (block 560). As described above, this assignment may be done via a ranking system that issues high-priority communication channels and resources to hosts and zones based on position within a ranking. In certain embodiments, assignment of priority may be accomplished through the use of one or more predetermined thresholds. When a host and associated zone exceed one or more thresholds, the process 500 may assign them a high-priority communication channel and associated resources. Conversely, if a host and associated zone fail to exceed a particular threshold, the process 500 may instead reduce their priority. In this way, high-priority communication channels can be reevaluated based on current conditions and not just historical conditions.

However, there may be embodiments wherein a limited number of available high-priority communication channels are available, and more than the limited number of hosts have been designated to receive a high-priority channel. In these embodiments, the process 500 may require eviction of one or more hosts and corresponding zones to a low-priority communication channel. A more detailed discussion of this process is described in FIGS. 6A-6B below.

Once assigned, the operations within the storage device can be evaluated for further processing (block 565). In specific cases where the storage device is scheduled to suspend activity via a sleep or shutdown mode, or when no commands are received indicating a re-evaluation of priorities should continue, the process 500 can end. However, often it is the case that operations do continue within the storage device. In these instances, the process 500 can update the time window start and end points in preparation for a re-evaluation scan (block 570).

Figure 6A:
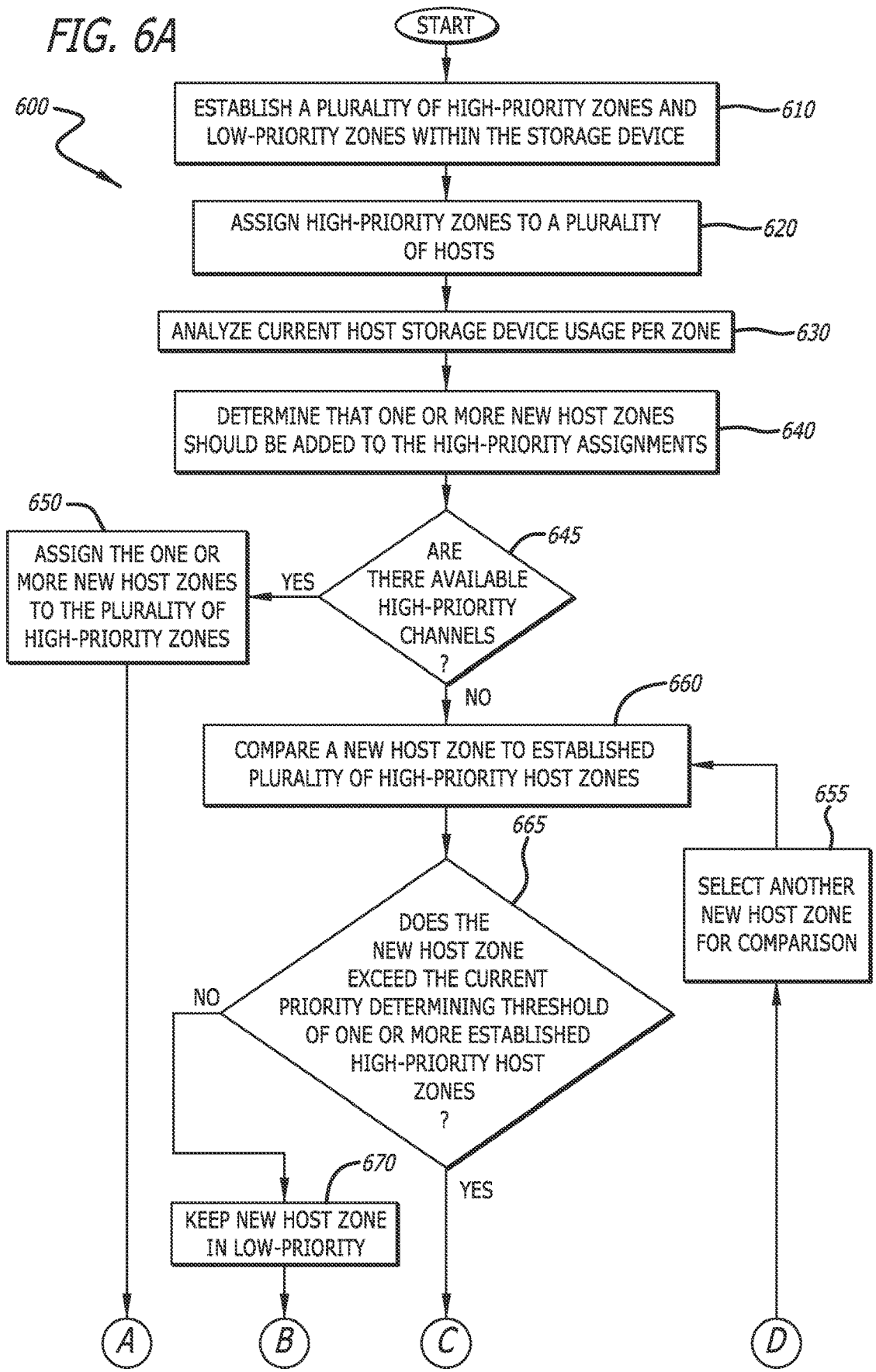
FIGS. 6A-6B are a flowchart depicting a process for managing a write stream priority pool in accordance with an embodiment of the disclosure.
Figure 6B:
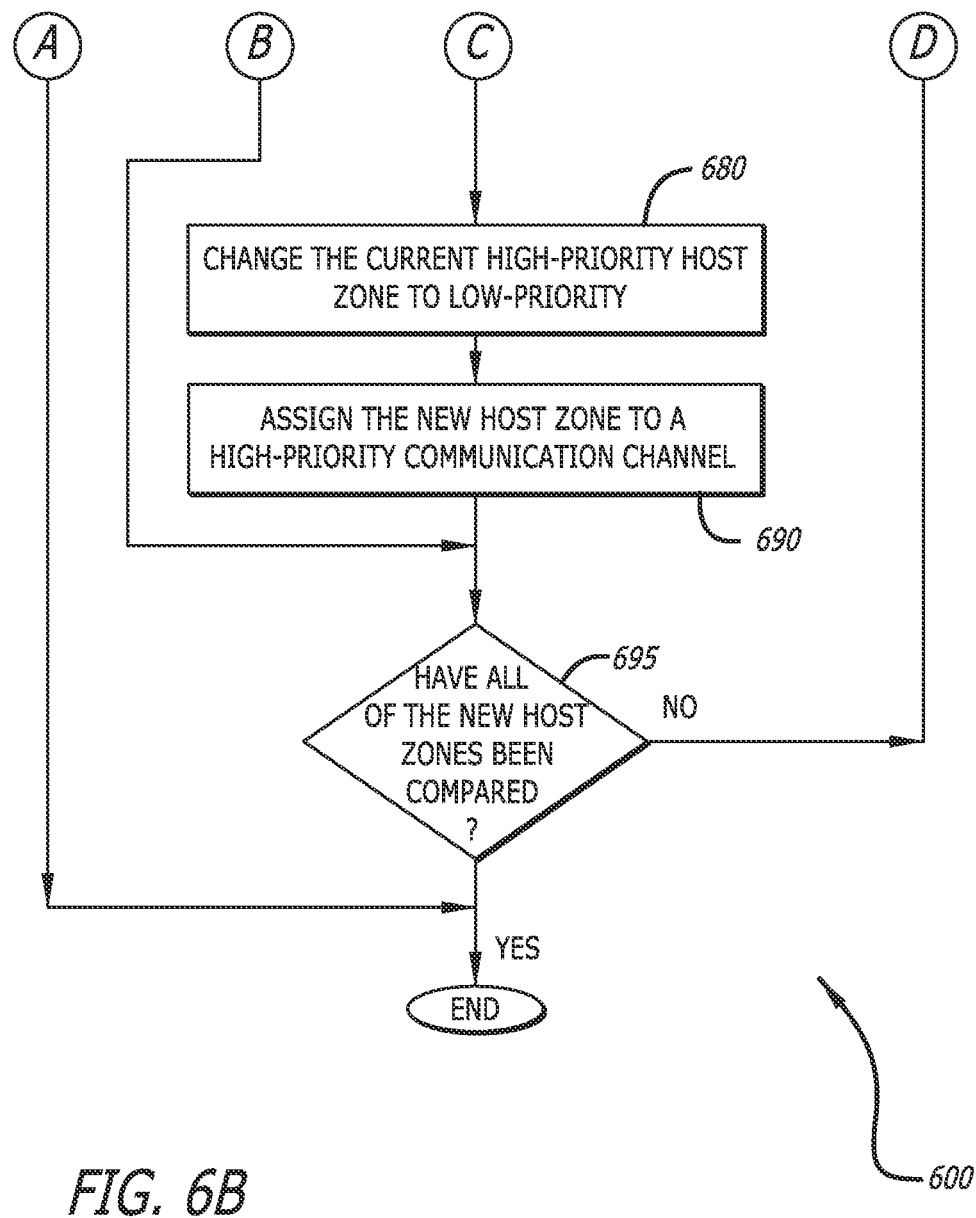

Referring to FIGS. 6A-6B, a flowchart depicting a process 600 for managing a write stream priority pool in accordance with an embodiment of the disclosure is shown. As discussed above with respect to FIG. 5, various embodiments may have a limited number of high-priority communication channels available, while there is also a large number of hosts and associated zones that have been classified as being assignable to a high-priority. In these embodiments, there is simply not enough high-priority channels and resources available to each host that has exceed the determinative pre-configured threshold(s).

Often, there is a previously established plurality of high- and low-priority zones within the storage device (block 610). One or more hosts are then (or were) assigned to at least a portion of the high-priority zones (block 620). Based upon a request or other received command and/or threshold being exceeded, the storage device begins to analyze the current host storage device usage per zone (block 630). As described above, the process 600 may utilize a threshold classification method to determine that one or more new "host zones" (i.e., hosts and their associated storage device zones) should be added to the high-priority assignments (block 640). Thus, a group of hosts and associated zones are determined to be suitable for receiving high-priority communication channels.

Once one or more of the newly determined hosts and associated zones are found, the process 600 can determine if there are any available high-priority channels that can be assigned (block 645). When there is a sufficient amount of high-priority communication channels available to assign, the process 600 can assign the one or more new host zones to the plurality of high-priority zones (block 650). The process 600 can subsequently end at this step.

If there are not a sufficient number of high-priority communication channels available to distribute, then the process 600 can compare one of the group of new host zones against the previously established plurality of high-priority host zones (block 660). Generally, the process 600 can determine if the new host zone exceeds the current priority determining threshold of one or more established high-priority host zones (block 665). In various embodiments, the comparison and priority determining threshold can be between a ranking that has been generated on both the new and previously established hosts and associated zones. In additional embodiments, the comparison can be done against a previously generated ranking, such that rankings or other determinations are only processed on newly added hosts and associated zones. It is contemplated however, that other priority determining thresholds may be utilized beyond rankings, such as usage, used space, age, etc.

If the compared newly compared host zone is determined to have a higher ranking (or other exceeded priority determining threshold), the process 600 can change the current high-priority host zone to low-priority (or lower priority in systems that have more than two levels of priority) (block 680). Once completed, at least one new high-priority communication channel will then become available which may then be assigned to the new host zone (block 690). If the new host zone does not exceed the priority determining threshold or otherwise exceed the ranking of the lowest ranked established host zone, then the process 600 can then simply keep the new host zone as low priority (block 670).

Once the comparison and eventual assignment have been completed, the process 600 can determine if all of the new host zones been compared against the previously established high-priority host zones (block 695). If all new host zones have been evaluated, then the process 600 can end. If more new host zones have yet to be compared, then another new host zone can be selected for comparison (block 655). This process will repeat until all new host zones have been evaluated, at which point the process 600 ends.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
   a processor;
   a memory array comprising a plurality of memory devices, wherein the plurality of memory devices is grouped into a plurality of zones;
   a plurality of communication channels configured to connect to a plurality of hosts, wherein:
      each zone of the plurality of zones is configured to communicate with a single host; and
      the plurality of communication channels comprises both high-priority communication channels and low-priority communication channels; and
   a priority assignment logic, executed by the processor, configured to:
      in response to a determination that data transmitted from a host of the plurality of hosts comprises indication signal indicative of a high-priority communication requirement, assign a high-priority communication channel to the host; and
      provide a use of the high-priority communication channel to the host;
      establish a time window-based analysis with respect to host data stream write patterns;
      scan for one or more available zones within the storage device; and
      determine an amount of storage device usage commands issued per zone.

2. The device of claim 1, wherein the indication signal comprises zone data velocity toward the device.

3. The device of claim 2, wherein the priority assignment logic is configured to:
   determine an alternative data path for the transmitted data associated with the indication signal.

4. The device of claim 1, wherein the device is a storage device.

5. The device of claim 4, wherein the storage device is a flash-based storage device.

6. The device of claim 5, wherein the flash-based storage device utilizes the non-volatile memory express (NVMe) protocol.

7. The device of claim 6, wherein the plurality of zones are zoned namespaces.

8. The device of claim 1, wherein the priority assignment logic is configured to receive metadata from the host.

9. The device of claim 8, wherein the priority assignment logic is configured to analyze the received metadata and provide the use of the high-priority channel to the host based on the analyzed metadata.

10. The device of claim 9, wherein the received metadata is transmitted from the host to the device during normal operations.

11. A method for assigning zone priorities in a device comprising:
    receiving data from a plurality of hosts;
    determining whether the received data from a host of the plurality of hosts comprises indication signal indicative of a high-priority communication requirement;
    assigning a high-priority communication channel to the host;
    providing a use of the high-priority communication channel to the host,
    wherein the device comprises a plurality of zones and a plurality of communication channels to connect to the plurality of hosts;
    establishing a time window-based analysis with respect to host data stream write patterns;
    scanning for one or more available zones within the storage device; and
    determining an amount of storage device usage commands issued per zone.

12. The method of claim 11, wherein the indication signal comprises zone data velocity toward the device.

13. The method of claim 12, further comprising determining an alternative data path for the transmitted data associated with the indication signal.

14. The method of claim 11, wherein the device is a storage device.

15. The method of claim 14, wherein the storage device is a flash-based storage device.

16. The method of claim 15, wherein the flash-based storage device utilizes the non-volatile memory express (NVMe) protocol.

17. The method of claim 16, wherein the plurality of zones are zoned namespaces.

18. The method of claim 11, further comprising receiving metadata from the host.

19. The method of claim 18, further comprising analyzing the received metadata and providing the use of the high-priority channel to the host based on the analyzed metadata, wherein the received metadata is transmitted from the host to the device during normal operations.

20. A non-transitory machine-readable medium having instructions stored therein, which when executed by a processor, direct the processor to perform operations comprising:
- receiving data from a plurality of hosts;
- determining whether the received data from a host of the plurality of hosts comprises indication signal indicative of a high-priority communication requirement;
- assigning a high-priority communication channel to the host;
  - providing a use of the high-priority communication channel to the host;
    - establishing a time window-based analysis with respect to host data stream write patterns;
    - scanning for one or more available zones within the storage device; and
    - determining an amount of storage device usage commands issued per zone.

\* \* \* \* \*